United States Patent [19]

Soldner

[11] Patent Number: 5,584,526
[45] Date of Patent: Dec. 17, 1996

[54] FIXEDLY INSTALLABLE WINDOW PANE FOR MOTOR VEHICLES

[75] Inventor: Karl Soldner, Weissach im Tal, Germany

[73] Assignee: Richard Fritz GmbH & Co. KG, Besigheim, Germany

[21] Appl. No.: 216,053

[22] Filed: Mar. 21, 1994

[30] Foreign Application Priority Data

Mar. 20, 1993 [DE] Germany .................. 43 09 088.5

[51] Int. Cl.⁶ .................................................. B60J 1/10
[52] U.S. Cl. .................. 296/146.15; 52/204.591; 52/208
[58] Field of Search .................. 296/146.15, 84.1, 296/90, 93, 96.21, 200, 201; 52/208, 204.591, 204.597, 204.599

[56] References Cited

U.S. PATENT DOCUMENTS 4,768,319  9/1988  Derner .................................. 52/208

FOREIGN PATENT DOCUMENTS 0268815  6/1988  European Pat. Off. .
0304694  3/1989  European Pat. Off. .
2039770  2/1972  Germany .
2224799  12/1973  Germany .
3140366  6/1983  Germany .
9013766.3  1/1991  Germany .
4008702  9/1991  Germany .
2132130  7/1984  United Kingdom .

Primary Examiner—Andrew C. Pike
Attorney, Agent, or Firm—Foley & Lardner

[57] ABSTRACT

A window pane apparatus for installation in a vehicle includes a pane having inner and outer sides and a border region and a frame attached to the pane. The frame includes a retaining element for retaining the apparatus to the vehicle, the retaining element defining a retaining groove which is aligned approximately parallel to the pane, the retaining element further including an elastic retaining strip which borders a side of the retaining groove farthest from the pane; and a sealing element for sealing the apparatus to the vehicle, the sealing element including a peripheral rib. The frame defines at least one recess along its circumferential extent. The apparatus includes a primary spring clip for inserting in the recess.

20 Claims, 4 Drawing Sheets

FIXEDLY INSTALLABLE WINDOW PANE FOR MOTOR VEHICLES

BACKGROUND OF THE INVENTION

Motor vehicles generally have a plurality of openings in the body, which are closed by panes of glass, to be precise sometimes with movably guided panes, which in many cases are coupled to a drive, and sometimes with fixedly installed panes. Known among the fixedly installable panes are those which have a peripheral frame of plastic which is permanently bonded to the pane in the border region of the inner side of the pane and along the border of the pane, for example as disclosed in European Patent Publication No. 304 694. This frame is molded directly onto the pane by using an adhesion promoter. The frame has sealing elements in the form of peripheral ribs of small cross-sectional width, which during installation of the pane come to bear against the border regions of the body opening. For securing the pane in the body opening, the frame also has cross-sectionally hook-shaped retaining elements.

The retaining elements have a web which runs normally with respect to the pane and, at the end of the web, a hook with a locking face running parallel to the pane and to the body part and with a ramp face facing away from the locking face. When the pane is brought to bear against the body opening, the retaining elements are bent to the side on account of the ramp face at the end until, upon further pressing into place of the pane, the hook end of the retaining elements snaps in behind the body part and its locking face bears against the body part and secures the pane.

In the case of a frame of a plastic of relatively low dimensional stability, the retaining elements are formed by inserts of a plastic of relatively great dimensional stability, which are arranged on the frame, distributed at intervals in the circumferential direction. During production of the frame they are initially placed into the compression mold for the frame, as is the pane itself, so that a foot provided on them is molded around by the material of the frame and the retaining elements are thereby permanently bonded to the frame and to the pane. In the case of a frame of a plastic of relatively great dimensional stability, the retaining elements are produced in one piece with the other profile parts of the frame. Then, however, there is provided on the frame a peripheral groove for receiving a peripheral soft seal, which has to be additionally inserted during installation of the pane.

In the case of the first-mentioned embodiment of the known pane, the installation is admittedly relatively simple. However, it makes production relatively complex, because the inserts have to be produced separately and have to be inserted individually into the compression mold for the frame. As a result, the compression mold is also very complicated and its handling is laborious. In addition, the pane is not very burglarproof, because the webs with the hook ends can be bent away from the body part relatively easily by a thin tool pushed in through the relatively soft material of the frame and then the pane can be freely lifted out altogether. In the case of the last-mentioned embodiment of the known pane, production is admittedly simplified. However, due to the fact that the frame consists in its entirety of a material of relatively high dimensional stability, the pliancy of the frame is less, so that a soft seal has to be additionally inserted, not only for reasons of good sealing, but also due to the requirement that the frame should interact with the body without any clearance. This restricts the permissible production tolerances both in the case of the window frame and in the case of the body and also requires additional installation measures. In spite of the relatively high dimensional stability of the frame, such a window pane is not much more burglarproof because, due to the greater dimensional stability of the material of the frame, in this case adequate flexibility of the web with the hook end has to be achieved by a corresponding reduction in the wall thickness of the web and/or by the locking face being shortened. Both of these make it easier for the hook ends to be pushed away.

SUMMARY OF THE INVENTION

An object of the present invention is that of providing a fixedly installable window pane which can be produced in a simple manner, is able to compensate for even relatively great production tolerances of the body parts and is more burglarproof than the known pane.

A preferred embodiment of the present invention intended to accomplish these and other objects is a window pane apparatus for installation in a vehicle having a structural body part or opening. The window pane apparatus includes a pane having inner and outer sides and a border region. The window pane apparatus also includes a frame attached to the pane in the border region of the inner side of the pane. The frame includes a retaining element for retaining the window pane apparatus to the structural part of the vehicle. The retaining element defines a retaining groove aligned at least approximately parallel to the pane. The retaining element opens in the direction of an adjacent free border of the pane. The retaining element includes an elastic retaining strip which borders a side of the retaining groove farthest from the pane. The retaining groove preferably includes a first side wall, remote from the pane and having an undulating cross section, and a second side wall opposite the first side wall. The first and second side walls define a mouth of the retaining groove. At the mouth of the retaining groove, the distance from the first side wall to the second side wall is less than a thickness of a structural part of the vehicle engaged in the retaining groove.

The window pane apparatus also includes a sealing element with a peripheral rib. The sealing element seals the apparatus to the structural part of the vehicle.

The frame of the window pane apparatus defines at least one recess along its circumferential extent. The recess has a finite longitudinal extent and a generally U-shaped cross section. The recess is spaced apart at a distance from the retaining groove. A leg of the generally U-shaped cross section that is adjacent the pane includes a groove, and the remainder of the generally U-shaped cross section opens outwardly.

The window frame apparatus further includes a primary spring clip for insertion into the recess of the frame. The primary spring clip has a dimension in a longitudinal direction that is less than the finite longitudinal extent of the recess. The primary spring clip, generally U-shaped in cross section, includes a web and two legs. Both legs have free ends. The distance between bearing contact surfaces of the legs when the legs are in a relaxed state is less than the distance between the bearing contact surfaces of the legs when the clip is inserted into the recess of the frame.

In a preferred embodiment of the present invention, at least one of the legs of the primary spring clip includes a first anchoring element. The first anchoring element anchors the primary spring clip to the frame. The first anchoring element has an inwardly notched tongue with an end aligned toward the web of the primary spring clip.

In a second embodiment of the present invention, at least one of the legs of the primary spring clip includes a second anchoring element. The second anchoring element has an outwardly notched tongue. The end of the notched tongue is directed away from the web of the primary spring clip. The other leg of the primary spring clip preferably includes a third anchoring element having a second recess.

In this second embodiment, the window pane apparatus further includes an inner paneling as the structural part of the vehicle. The inner paneling has a border section. At least in the region of the recess of the frame where the primary spring clip is inserted, the border section protrudes into the recess on a side of the frame adjoining the pane and on a side of the frame facing away from the pane. The border section is anchored on the tongue of the second anchoring element. The border section includes a portion which extends into the groove of the leg of the generally U-shaped cross section of the frame recess adjacent the pane. That portion is anchored at the second recess of the third anchoring element on the other leg of the primary spring clip.

In a third preferred embodiment of the present invention, the primary spring clip further includes a fourth anchoring element on an outer side of the web of the primary spring clip. The fourth anchoring element has a secondary spring clip with first and second sections. The first section adjoins the primary spring clip and is aligned at least approximately oppositely to the direction of extent of the legs of the primary spring clip. The second section is aligned at least partly approximately parallel to the web of the primary spring clip. An end section of the second section has a smaller clear distance from the web than the remaining part of the second section.

In this third embodiment, the window pane apparatus further includes an inner paneling as the structural part of the vehicle. The inner paneling has a border section. At least in the region of the recess of the frame which receives the primary spring clip, the boarder section includes a retaining strip for receiving the secondary spring clip.

In a fourth embodiment of the present invention, the legs of the primary spring clip have such a length that, after their insertion into the recess of the frame, the web of the primary spring clip is spaced from a wall section of the recess facing the web. The web of the primary spring clip includes at least one aperture.

In this fourth embodiment, the window pane apparatus further includes an inner paneling as the structural part of the vehicle. The inner paneling has a border section. At least in the region of the recess of the frame which receives the primary spring clip, the border section extends to the side of the frame adjoining the pane. The border section includes a plastic projection extending through the aperture on the web of the primary spring clip. The plastic projection terminates in a head to anchor the primary spring clip to the border section. The dimension of the head, measured from an inner side of the web of the primary spring clip to an end of the head of the plastic projection, preferably is at least approximately equal to a distance from the web of to the wall section of the recess facing the web.

In a fifth embodiment of the present invention, the primary spring clip includes a fifth anchoring element. The fifth anchoring element, positioned on the outer side of the web, includes a tongue. The tongue is aligned oppositely to the direction of extent of the legs of the primary spring clip. The tongue is split in a longitudinal direction into end sections in its end region. The end sections are spread apart in opposite directions. The tongue is formed of a surface section notched out of the primary spring clip and embedded in the border section of an inner paneling forming the structural part of the vehicle.

Further, objects, features, and advantages of the invention will be apparent from the following detailed description of the preferred embodiments taken in conjunction with the attached drawing.

BRIEF DESCRIPTION OF THE DRAWINGS

The drawings are hereby expressly made a part of the specification. The invention is explained in more detail below with reference to illustrative embodiments represented in the drawings, in which.

DETAILED DESCRIPTION OF THE PREFERRED EMBODIMENTS

Figure 1:
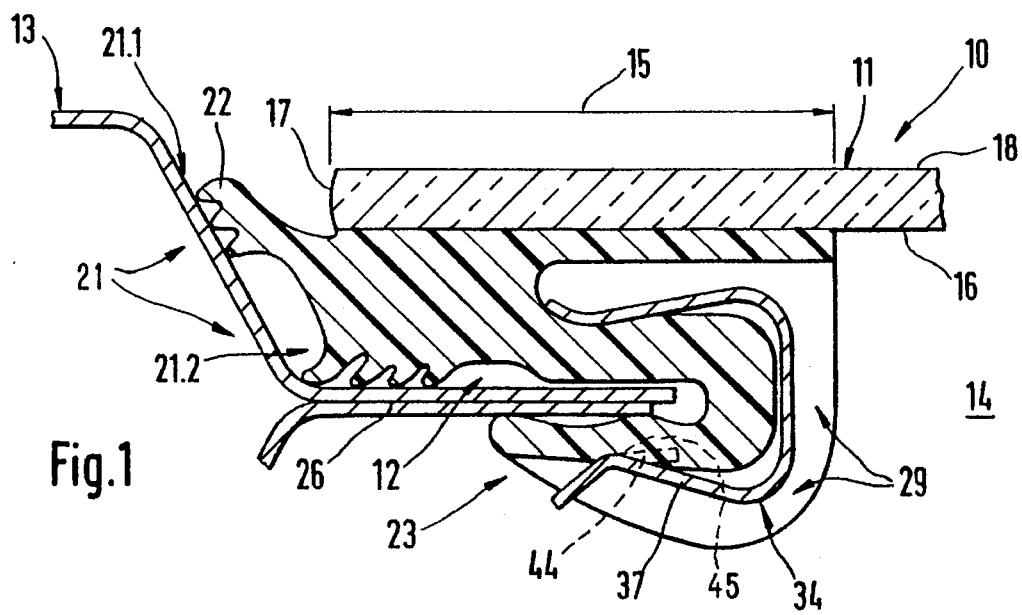
FIG. 1 shows a fragmentary cross section of a window pane apparatus in accordance with a preferred embodiment of the invention, as taken substantially along line 1—1 in FIG. 10.

Due to the fact that the retaining elements of the window frame are formed by a retaining groove, aligned parallel to the pane, and a flexurally elastic retaining strip aligned in the same direction, these retaining elements can be produced together with the sealing elements in one piece. The recesses for the spring clips can be produced at the same time. No insert parts are required in the production of the frame. No additional sealing means are required in the installation of the pane. Since the spring clips subsequently fitted in the installation of the pane assume a great part of the retaining force, a material of relatively low dimensional stability and a correspondingly greater compliance can be used for the frame and consequently also for the sealing elements and the retaining elements, so that the installation of the pane by the known cord method is possible without any problems. As a result, the frame is also given such great pliancy that it is readily able to compensate for the usual production tolerances in bodymaking. In the case of this pane, in the installed state, the continuous retaining strip lies underneath the metal body parts. Thus, it cannot be pushed away by a tool from the outside. Violent lifting out of the pane is made very much more difficult, not to say prevented, by the fact that the forces thereby occurring between the body part and the retaining strip act on the retaining strip at its root and, as a result, can scarcely bend away the retaining strip. At the same time, the spring clips with their greater retaining force oppose bending away of the retaining strip.

In one aspect of the invention, at least in the region of the mouth of the groove, the retaining strip bears with a certain prestress against the body part engaging in the groove, so that as a result the sealing effect is increased. This is further increased by an undulating profile of the side wall of the groove, because the proportion of bearing surface areas is reduced by the undulating form and, as a result, the surface pressure in the bearing areas is in turn increased.

In a second aspect of the invention, above and beyond the frictional force produced by the clamping force of the spring clip, an anchorage is achieved by form closure with the frame.

A third aspect of the invention allows an interior paneling provided for the body to be fastened in the region of the pane in a simple way with the aid of the spring clips present in any case, without requiring additional fastening means for this. In this case, it is also achieved that the inner paneling at the same time also covers the frame and that region of the body in which the pane is bonded to the body.

In a fourth aspect of the invention, the parts of the inner paneling can be clipped in very simply on the frame of the window pane by means of the secondary spring clips and, if need be, also be removed again just as easily.

In a fifth aspect of the invention, the spring clips are already bonded to the border section of the paneling, so that the fitting of the spring clips on the frame is performed in the same operation as the attaching of the paneling. In a sixth aspect of the invention, the connecting element for the spring clip at the same time forms a positioning element for the spring clip and the paneling.

Figure 9:
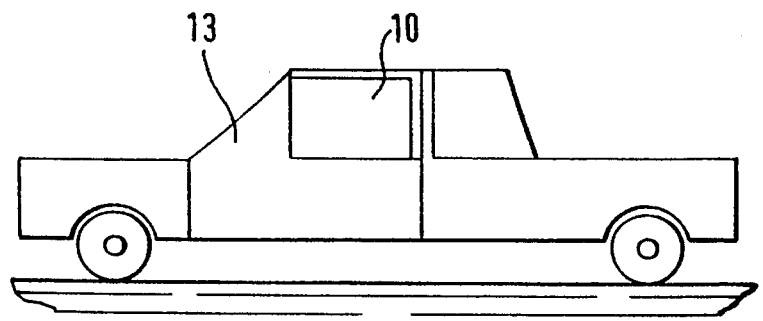
FIG. 9 schematically shows a motor vehicle in which the present invention may be installed.

The fixedly installable pane 10 represents a structural unit comprising a plain pane of glass 11 and a peripheral frame 12 of plastic, This pane 10 is fitted in an opening of a motor vehicle body 13 (FIG. 9), in order to close the opening 14. Its outline is therefore matched to the outline of the body opening 14.

The structural unit of the pane 10 is produced by the pane of glass 11 being placed in a compression mold for the frame 12 and by the frame 12 being produced and at the same time permanently bonded to the pane of glass 11 in one operation. The frame 12 is to a certain extent molded onto the pane of glass 11. This takes place in a border region 15 of the inner side 16 of the pane of glass 11. The free border 17 of the pane of glass 11 may in this case remain free, as is represented in FIG. 1, or it may also be molded around by the material of the frame 12, the frame 12 then generally terminating flush with the outer side 18 of the pane of glass 11. If it is desired, for example for design reasons, the frame 12 may also reach as far as the outer side 18 and likewise cover a certain border region there.

Figure 2:
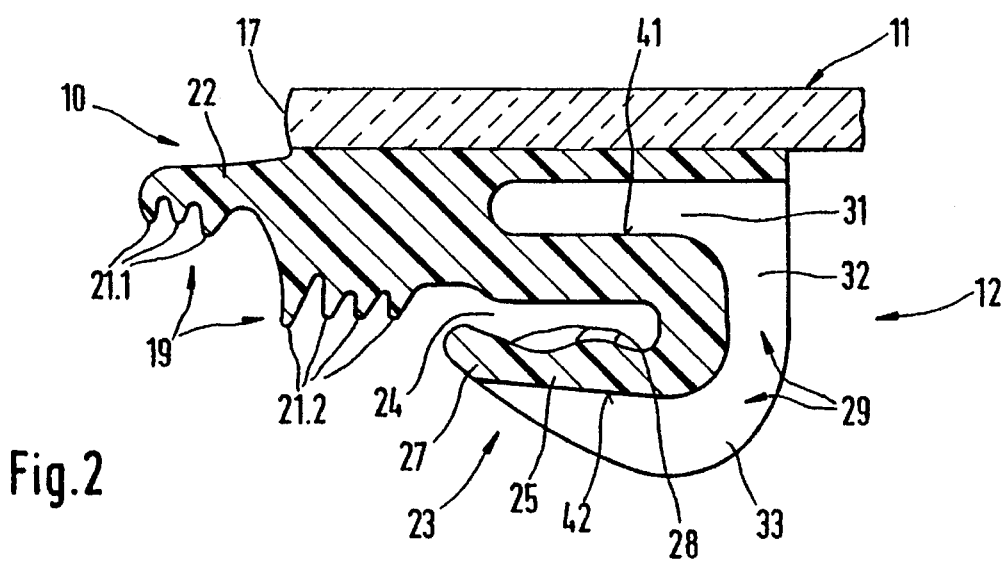
FIG. 2 shows a fragmentary cross section of the pane according to FIG. 1.

As is evident from FIGS. 1 and 2, the frame 12 has a plurality of sealing elements 19 in the form of peripheral ribs 21, which are divided into two groups which, for better distinction, are denoted by 21.1 and 21.22. Each of the peripheral ribs 21.1 and 21.2 has a relatively small cross section. During fitting of the pane 10, these peripheral ribs 21.1 and 21.2 come to bear against the body 13 (FIG. 1). The ribs are either individually bent around relatively easily, as is evident in the case of the ribs 21.2, or the ribs are bent away together with the profile part 22 bearing them, as is the case with the ribs 21.1. The bending around or bending away produces a prestress in the ribs, which increases the sealing effect of the sealing elements 19.

The frame 12 also has retaining elements 23, by which the pane 10 is secured in the region of the opening 14 of the body 13 on said body. These retaining elements 23 are formed by a peripheral retaining groove 24 and by a peripheral retaining strip 25. The retaining groove 24 is aligned at least approximately parallel to the pane of glass 11 and is open in the direction of the border 17 of the pane. Inside, the retaining groove 24 has a clear width which is at least approximately equal to the thickness of the body part 26 engaging in it (FIG. 1). In the region of its mouth or, in other words, in the region of the end section 27 of the retaining strip 25, the clear width of the groove 24 is less than the thickness of the body part 26, so that after installation of the pane 10 at least the end section 27 of the retaining strip 25 bears with a certain prestress against the body part 26 and, as a result, the retaining strip 25 has at the same time a certain sealing effect with respect to the body 13. For this reason, the side wall 28 of the groove 24 facing away from the pane of glass 11, which side wall at the same time represents the inner side of the retaining strip 25, is also of an undulating design in cross section, in order that the bearing contact with the body part 26 is restricted to just a few surface sections and the surface pressure there is increased.

Figure 10:
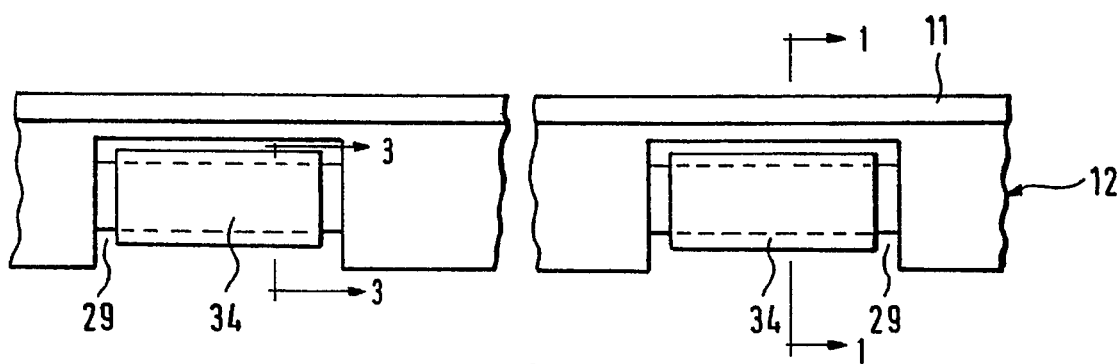
FIG. 10 shows a fragmentary side elevation view of the window pane apparatus in accordance with a preferred embodiment of the invention.
Figure 11:
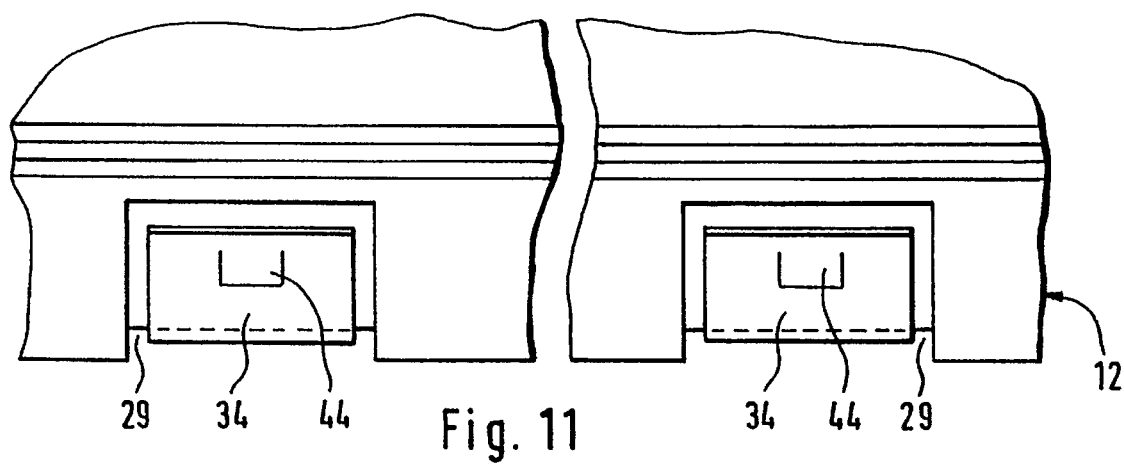
FIG. 11 shows a fragmentary bottom view of the window pane apparatus in accordance with a preferred embodiment of the invention.

As is evident from FIGS. 1 and 2, the frame 12 has recesses 29 (FIG. 2). As shown in FIGS. 10 and 11, the recesses 29 are arranged such that they are distributed in the circumferential extent of the frame 12. They have in the circumferential direction a length of about 30 mm. The recesses 29 have a U-shaped cross-sectional profile, which surrounds the retaining groove 24 at about the same distance on three sides. The profile section 31 situated closer to the pane of glass 11, which section forms the one profile leg of the U profile, is designed in the form of a groove and is aligned parallel to the pane of glass. The other two profile sections 32 and 33, which respectively correspond to the web and to the second leg of the U profile, are open toward the outside, i.e. toward the outer side of the frame 12 (FIG. 11).

When installing the pane 10 into the body 13, a spring clip 34 is in each case inserted into each recess 29 (FIGS. 1, 10, and 11). The spring clip 34 has approximately a U-shaped outline, which is matched to the cross-sectional profile of the recesses 29. The web 35 and the two legs 36 and 37 merge into each other in the form of a bow. The end sections 38 and 39 of the legs 36 and 37 run outwardly curved in the form of a bow. In the unclamped state of the spring clip 34, its legs 36 and 37 run at an acute angle toward each other. In the transitional region of the leg 36 and 37 with respect to the associated end section 38 and 39, respectively, the clear distance between the two legs 36 and 37 is less than the distance between their respective bearing surfaces 41 and 42 in the recess 29 (FIG. 2).

Figures 3, 4:
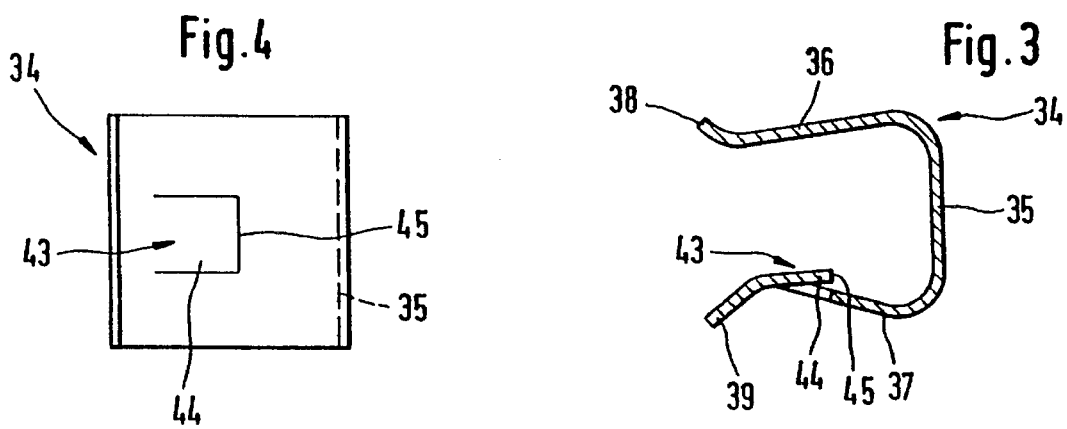
FIG. 3 shows a cross section of a spring clip of the window pane apparatus of FIG. 1, as taken substantially along line 3—3 in FIG. 10.
FIG. 4 shows a bottom view of the spring clip of FIG. 3.

As already indicated in FIG. 1 and clearly to be seen in FIGS. 3 and 4, on one of the legs of the spring clip 34, to be precise on the leg 37, there is an anchoring element 43 for an anchorage of the spring clip 34 on the frame 12. This anchoring element 43 is formed by a tongue 44, which is notched inward on the leg 37, its tongue end being aligned with the web 35 of the spring clip 34. The spring clip 34 is expediently inserted into the recess 29 such that its leg 37 with the tongue 44 is located in the profile section 33 of the recess 29 situated at a location remote from the pane of glass 11. The spring clip 34 has a dimension in a longitudinal direction substantially along the length of legs 36 and 37 that is less than the finite longitudinal extent of recess 29. During insertion of the spring clip 34, the tongue 44 slides to a greater or lesser extent along the inner wall of the profile section 33 of the recess 29 and then presses itself into the material of the retaining strip 25. If a withdrawing force is exerted on the spring clip 34 without the leg 37 first of all being raised, an end 45 of the tongue 44 digs into the retaining strip 25 and thus prevents sliding out of the spring clip 34 from the recess 29.

Figure 5:
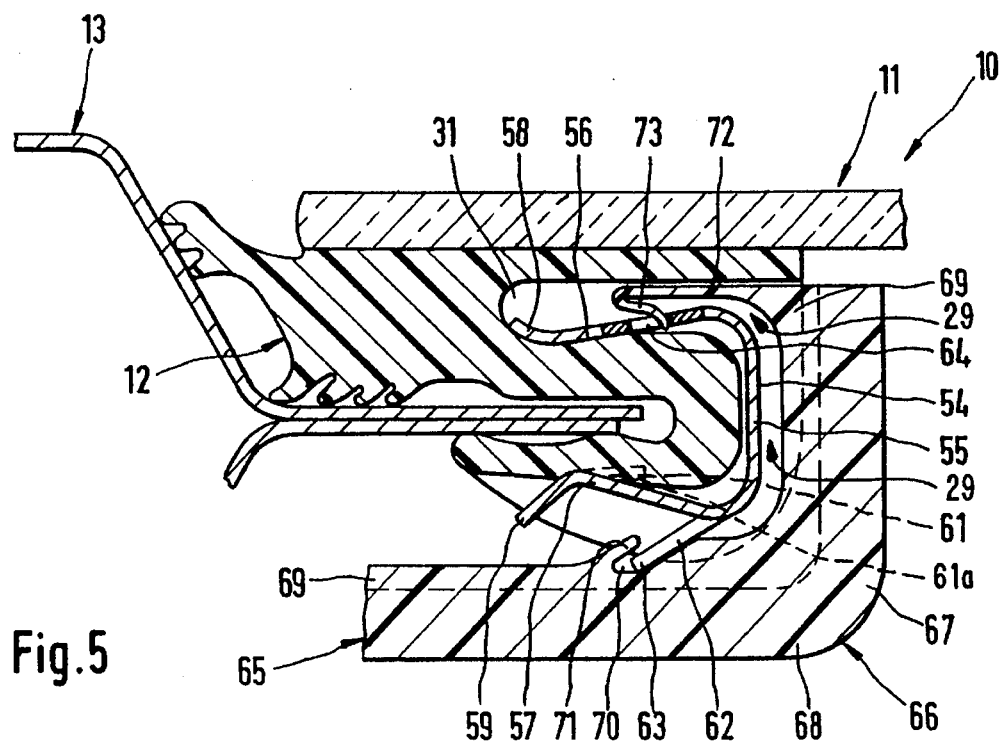
FIG. 5 shows a fragmentary cross section of a window pane apparatus in accordance with a second embodiment of the invention.

The pane 10 with a modified spring clip 54 can be seen from FIG. 5. The pane 10 itself is unchanged as a structural unit comprising the pane of glass 11 and the frame 12. Similarly, the body 13 is to be regarded as unchanged.

The spring clip 54 has the same outline as the spring clip 34. The spring clip 54 has the web 55 and the two legs 56 and 57, the respective end sections 58 and 59 of which are bent away outward. On the leg 57 there is, as the first anchoring element, the tongue 61, which is of an identical design to the tongue 44 of the spring clip 34. As a further anchoring element, on the leg 57 of the spring clip 54 there is a second tongue 62. It is notched outward from the leg 57, its end 63 being directed away from the web 55. The second tongue 62 is expediently situated in line with the first tongue 61, to be precise in such a way that the two ends 61a and 63 are directly opposite each other when extended straight.

As a further anchoring element, on the other leg 56 there is a recess 64. It may be designed as a circular hole or else as a rectangular hole. Instead of a single recess, there may also be a plurality of recesses 64, to be precise of the same and/or different outline form.

In the region of the pane 10 there is provided an inner paneling 65 for the body 13. In FIG. 5, only the border section 66 of it is represented. It has an L-shaped cross-sectional form with the angle legs 67 and 68, which surround the frame 12 at a small distance on the side adjoining the pane of glass 11 and facing away from the pane of glass 11. For better positioning on the frame 12, the border section 66 has on its inner side, facing the frame 12, in the region of each recess 29, a guide rib 69, the width of which, measured in the direction of the extent of the frame 12, is slightly less than the length of the recess 29, measured in the same direction.

In the region of the second tongue 62 of the spring clip 54, there is expediently on the guide rib 69 a recess 70 which is aligned transversely to the guide rib 69 and runs obliquely, approximately in the same way as the second tongue 62. The recess 70 is expediently partially covered by a lip 71, so that the tongue 62 engaging in the recess 70 has additional retention.

At the end of the profile leg 67 there is a tongue-shaped profile part 72, which adjoins the guide rib 69 and extends into the profile section 31 of the recess 29 (FIG. 2) and in the latter engages by a hook-shaped end section 73 in the recess 64 on the leg 56 of the spring clip 54. As a result, the border section 66 of the inner paneling 65 is anchored both in the recess 29 of the frame 12 and on the spring clip 54.

Figure 6:
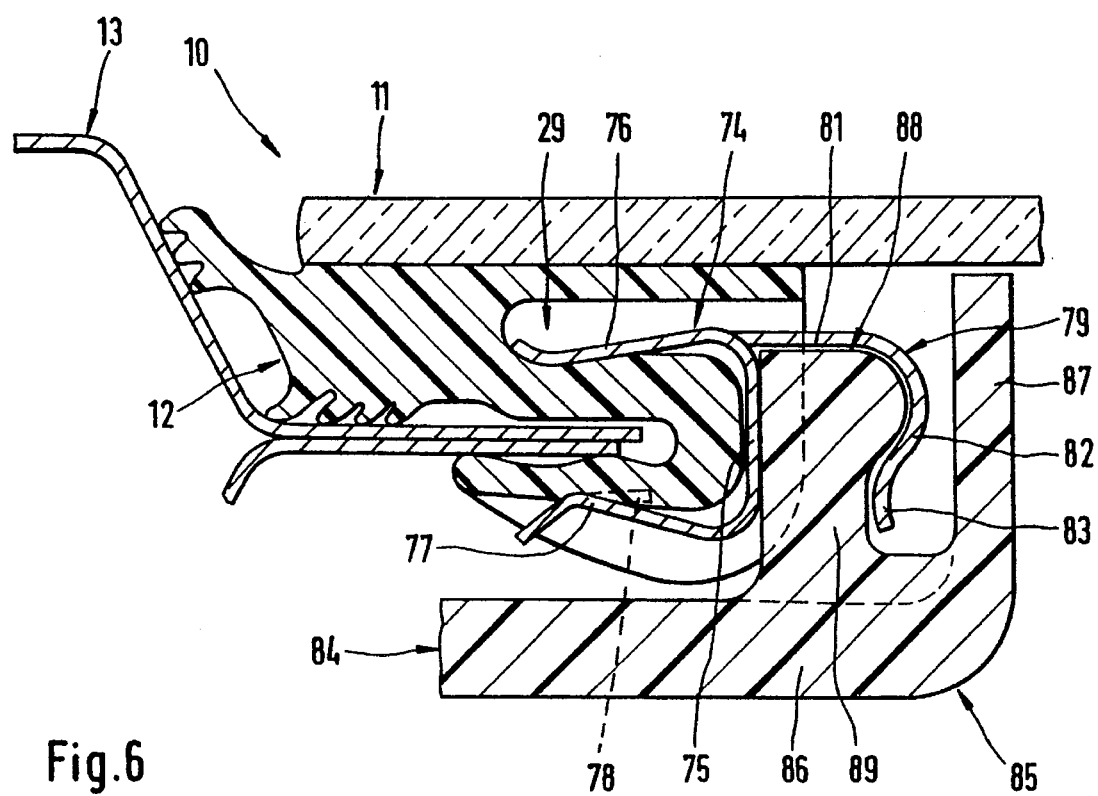
FIG. 6 shows a fragmentary cross section of a window pane apparatus in accordance with a third embodiment of the invention.

FIG. 6 reveals the pane 10 with the spring clip 74, which represents a further modification in comparison with the embodiments described above. The spring clip 74 has the same outline as the spring clip 34 and has the web 75 and the two legs 76 and 77. On the leg 77 there is notched inward the tongue 78, which is identical to the tongue 44.

The modification of the spring clip 74 is that on it there is as a further anchoring element a secondary spring clip 79. It is formed by a surface section notched out of the primary spring clip 74, which section is preferably situated in line with the tongue 78 and, when extended straight, directly adjoins the end of the tongue 78. The first section of length 81 of the secondary spring clip 79 adjoins the primary spring clip 74 at the bow-shaped transition of the latter between the web 75 and the leg 76 and extends approximately in the opposite direction to that of the leg 76. The second section of length 82 adjoins the first section of length 81 in the form of a bow and runs partly parallel to the web 75 and partly at an acute angle toward the line of the web 75. In a similar way to that in the case of the legs 76 and 77 of the primary spring clip 74, the end section 83 of the secondary spring clip 79 is slightly bent away outward.

On the inner paneling 84, the border section 85 in turn has an L-shaped cross-sectional form and has the two angle legs 86 and 87. In the region of the recesses 29 of the frame 12, there are anchoring elements 88 on the border section 85 on the inner side. They are designed as retaining strips 89, the cross-sectional shape and arrangement of which are matched to the design and arrangement of the secondary spring clips 79. As can be seen from FIG. 6, the cross-sectional form of the retaining strip 89 protrudes partly into the recess 29, so that the inner paneling 84 can be definitively positioned on the frame 12 in the case of this configuration of the pane 10 as well.

Figure 7:
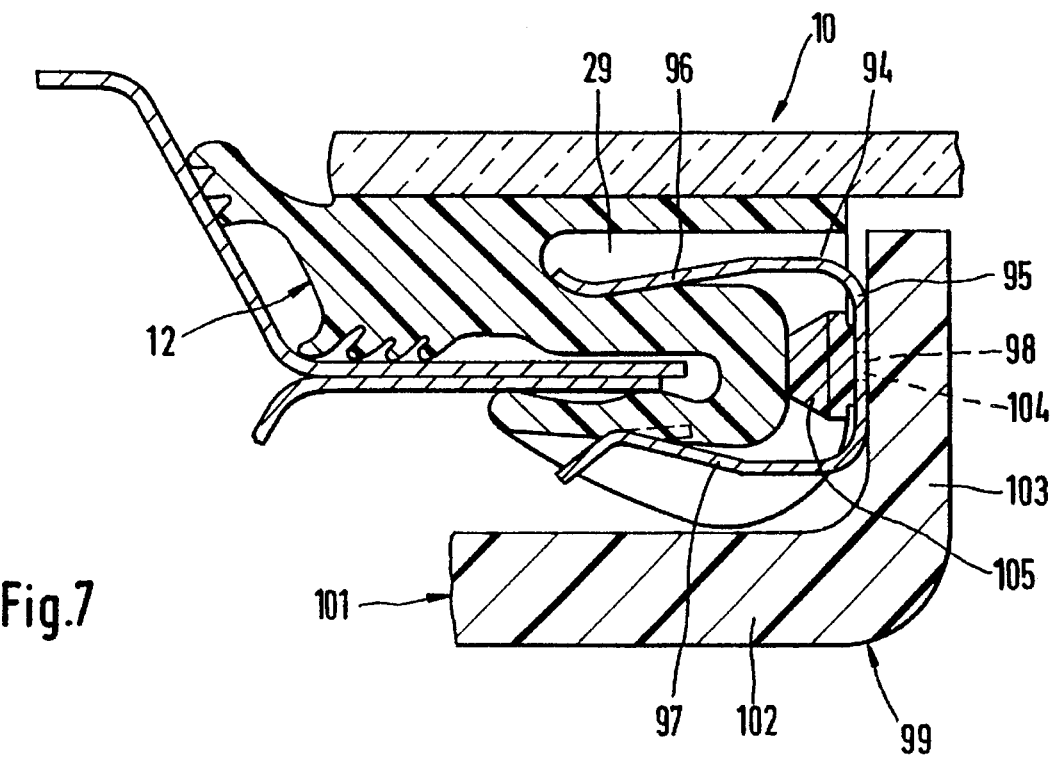
FIG. 7 shows a fragmentary cross section of a window pane apparatus in accordance with a fourth embodiment of the invention.

In the case of the pane 10 which can be seen from FIG. 7, the spring clip 94 is inserted. It has the web 95 and the legs 96 and 97. It has with regard to its basic form the same outline as the spring clip 34, with the difference that its legs 96 and 97 have such a length that their web 95 is outside the cross-sectional form of the recess 29 in the frame 12.

In the web 95 there is at least one recess 98 in the form of a preferably circular through-hole. Instead of the one recess 98, there may also be a plurality of recesses 98, for example two or three, which are arranged such that they are distributed uniformly with respect to the length of the spring clip 94. The border section 99 of the inner paneling 101 has in turn an L-shaped cross-sectional form with the angle legs 102 and 103, which reach to a greater or lesser extent almost up to the outer side of the frame 12. There, where the recess 98 of the spring clip 94 is located, the border section 99, specifically its angle leg 103, has a projection 104, which passes through the recess 98. The projection 104 ends in a head 105, which has a circular cross section, the diameter of which is greater than the clear width of the recess 98. The projection 104 and the head 105 are of the same plastic material as the border section 99. They are expediently molded on the latter already during its production, the spring clip 94 having been placed in the compression mold beforehand, so that the spring clip 94 is anchored on the border section 99. The spring clip 94 is therefore inserted into the recesses 29 of the frame 12 when attaching the border section 99 of the inner paneling 101. As a result, the border section 99 is anchored on the frame 12.

Figure 8:
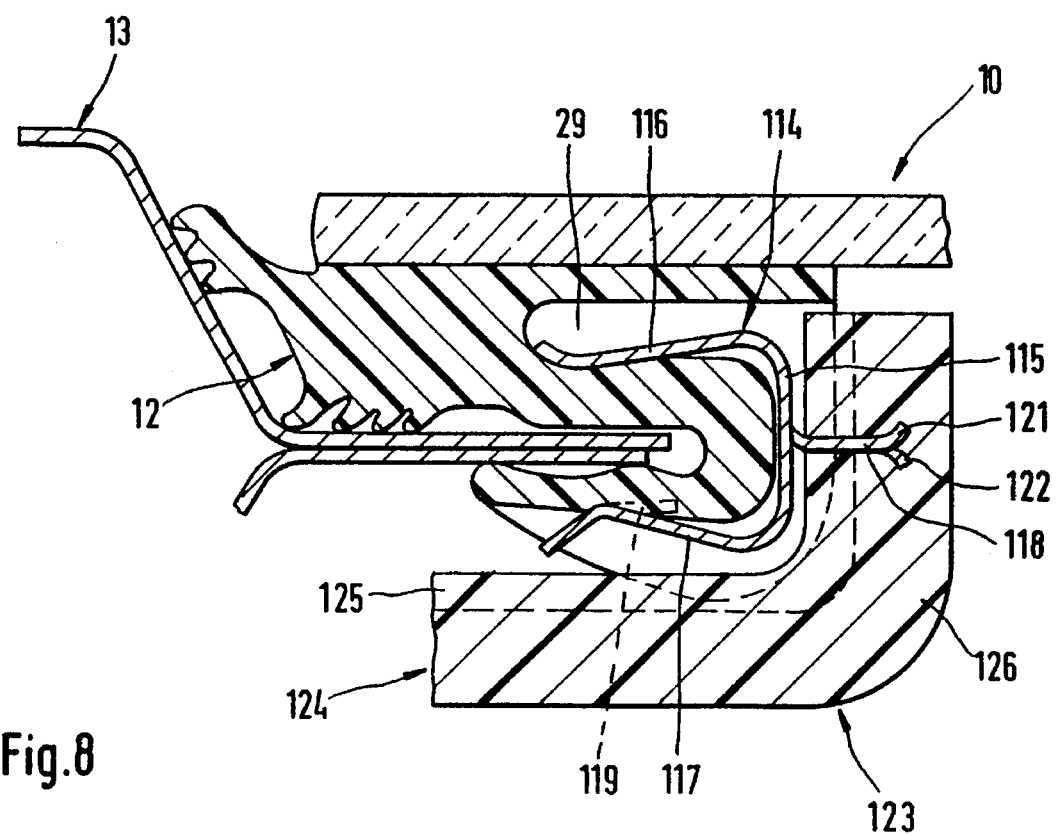
FIG. 8 shows a fragmentary cross section of a window pane apparatus in accordance with a fifth embodiment of the invention.

In the case of the pane 10 which can be seen from FIG. 8, the spring clip 114 is inserted. It has the web 115 and the two legs 116 and 117. It has with regard to its basic shape the same outline as the spring clip 34. In comparison with this spring clip, the spring clip 114 is modified to the extent that on its web 115 there is a tongue 118 as an anchoring element. This tongue is arranged approximately in the center of the height of the web 115 and extends oppositely to the direction of extent of the legs 116 and 117. The tongue 118 is formed by a surface section notched outward from the spring clip 114, which section is preferably situated in line with the tongue 119 of the leg 117. The tongue 118 is split at least once in the longitudinal direction in its end region. The resulting mutually separate end sections 121 and 122 are spread apart in mutually adverse directions. The border section 123 of the inner paneling 124 is here again provided with guide ribs 125, which are matched to the recesses 29 on the frame 12 and engage at least partly in these recesses. In the region of the angle leg 126 of the border section 123, which leg adjoins the pane 10, the tongue 118 of the spring clip 114 is embedded in the material of the border section 123 and its guide rib 124 and consequently anchors the spring clip 114 on the border section 123. The spring clip 114 is inserted by means of the border section 123 into the recess 29 and consequently the border section 123 is at the same time anchored on the frame 12.

While the present invention has been described by way of certain preferred embodiments, numerous alterations, modifications, and changes to the described embodiments are possible without departing from the spirit and scope of the invention, as defined by the appended claims, and equivalents thereof.

What is claimed is:

1. A window pane apparatus for installation in a vehicle having a structural part and an opening, said apparatus comprising:

a pane having inner and outer sides and a border region;

a frame attached to the pane, at least in the border region of the inner side of the pane, the frame including
      a retaining element for retaining the apparatus to the structural part, the retaining element defining a retaining groove which engages the structural part and is aligned at least approximately parallel to the pane and is open in a direction of an adjacent free border of the pane, the retaining element further including an elastic retaining strip which borders a side of the retaining groove farthest from the pane, and
      a sealing element for sealing the apparatus to the structural part, the sealing element including a peripheral rib;

wherein the frame defines at least one recess along a circumferential extent thereof, the recess having a finite longitudinal extent and a generally U-shaped cross section, the recess being spaced apart at a distance from the retaining groove, a leg of the generally U-shaped cross section that is adjacent the pane including a groove, a remainder of the U-shaped cross section being outwardly open; and a primary spring clip for inserting in the recess and having a dimension in a longitudinal direction that is less than the finite longitudinal extent of the recess, the primary spring clip having a generally U-shaped cross section, the primary spring clip including a web and two legs having free ends wherein in a relaxed state a clear distance between bearing contact surfaces of the legs is less than a distance between the bearing contact surfaces when the clip is inserted in the recess.

2. The apparatus of claim 1 wherein the retaining groove includes a first side wall remote from the pane and a second side wall opposite the first side wall, the first and second side walls defining therebetween a mouth of the retaining groove wherein in a region of the mouth a clear distance from the first side wall to the second side wall is less than a thickness of the structural part engaged in the retaining groove and wherein the first side wall includes an undulating cross section.

3. The apparatus of claim 2 wherein at least one of the legs of the primary spring clip includes a first anchoring element for anchoring the primary spring clip to the frame and wherein the anchoring element includes an inwardly notched tongue having an end which is aligned toward the web of the primary spring clip.

4. The apparatus of claim 2 wherein at least one of the legs of the primary spring clip includes a second anchoring element having an outwardly notched tongue with a tongue end which is directed away from the web of the primary spring clip and wherein a second leg of the primary spring clip includes a third anchoring element having a second recess, the apparatus further comprising:

an inner paneling for the structural part, the inner paneling having, in the region of the pane, a border section such that, at least in a region of the recess on the frame, where the primary spring clip is inserted, the border section protrudes into the recess of the frame on a side of the frame adjoining the pane and on a side of the frame facing away from the pane and is anchored on the tongue of the second anchoring element, the border section further comprising a portion which extends into the groove of the leg adjacent the pane of the generally U-shaped cross section of the recess of the frame;

wherein the portion is anchored at the second recess of the third anchoring element on the second leg of the primary spring clip.

5. The apparatus of claim 2 wherein the primary spring clip further comprises, on an outer side of the primary spring clip web, a fourth anchoring element including a secondary spring clip having first and second sections, the first section adjoining the primary spring clip and aligned at least approximately oppositely to a direction of extent of the legs of the primary spring clip and the second section aligned at least partly approximately parallel to the web of the primary spring clip, an end section of the second section having a smaller clear distance from the web than a remaining part of the second section, the apparatus further comprising:

an inner paneling for the structural part, the inner paneling having, in the region of the pane, a border section, the border section including, at least in a region of the recess on the frame which receives the primary spring clip with the fourth anchoring element, a retaining strip for receiving the secondary spring clip.

6. The apparatus of claim 2 wherein the legs of the primary spring clip have such a length that, after insertion of the legs into the recess on the frame, the web of the primary spring clip is spaced a distance from a wall section of the recess facing it and wherein the web of the primary spring clip includes at least one aperture, the apparatus further comprising:

an inner paneling for the structural part, the inner paneling having, in the region of the pane, a border section such that, at least in a region of the recess on the frame which receives the primary spring clip, the border section extends to a side of the frame adjoining the pane, wherein the border section includes a plastic projection extending through the aperture on the web of the primary spring clip and terminating in a head whereby the primary spring clip is anchored to the border section by the plastic projection.

7. The apparatus of claim 2 wherein the primary spring clip further comprises, on an outer side of the web thereof, a fifth anchoring element including a tongue which is aligned oppositely to a direction of extent of the legs of the primary spring clip, the tongue being split in a longitudinal direction into end sections in an end region thereof, the end sections being spread apart in opposite directions, wherein the tongue is embedded in a material of a border section of an inner paneling of the structure.

8. The apparatus of claim 1 wherein at least one of the legs of the primary spring clip includes a first anchoring element for anchoring the primary spring clip to the frame and wherein the anchoring element includes an inwardly notched tongue having an end which is aligned toward the web of the primary spring clip.

9. The apparatus of claim 8 wherein at least one of the legs of the primary spring clip includes a second anchoring element having an outwardly notched tongue with a tongue end which is directed away from the web of the primary spring clip and wherein a second leg of the primary spring clip includes a third anchoring element having a second recess, the apparatus further comprising:

an inner paneling for the structural part, the inner paneling having, in the region of the pane, a border section such that, at least in a region of the recess on the frame, where the primary spring clip is inserted, the border section protrudes into the recess of the frame on a side of the frame adjoining the pane and on a side of the frame facing away from the pane and is anchored on the tongue of the second anchoring element, the border section further comprising a portion which extends into the groove of the leg adjacent the pane of the generally U-shaped cross section of the recess of the frame;

wherein the portion is anchored at the second recess of the third anchoring element on the second leg of the primary spring clip.

10. The apparatus of claim 8 wherein the primary spring clip further comprises, on an outer side of the primary spring clip web, a fourth anchoring element including a secondary spring clip having first and second sections, the first section adjoining the primary spring clip and aligned at least approximately oppositely to a direction of extent of the legs of the primary spring clip and the second section aligned at least partly approximately parallel to the web of the primary spring clip, an end section of the second section having a smaller clear distance from the web than a remaining part of the second section, the apparatus further comprising:

an inner paneling for the structural part, the inner paneling having, in the region of the pane, a border section, the border section including, at least in a region of the recess on the frame which receives the primary spring clip with the fourth anchoring element, a retaining strip for receiving the secondary spring clip.

11. The apparatus of claim 8 wherein the legs of the primary spring clip have such a length that, after insertion of the legs into the recess on the frame, the web of the primary spring clip is spaced a distance from a wall section of the recess facing it and wherein the web of the primary spring clip includes at least one aperture; the apparatus further comprising:

an inner paneling for the structural part, the inner paneling having, in the region of the pane, a border section such that, at least in a region of the recess on the frame which receives the primary spring clip, the border section extends to a side of the frame adjoining the pane, wherein the border section includes a plastic projection extending through the aperture on the web of the primary spring clip and terminating in a head whereby the primary spring clip is anchored to the border section by the plastic projection.

12. The apparatus of claim 1 wherein at least one of the legs of the primary spring clip includes a second anchoring element having an outwardly notched tongue with a tongue end which is directed away from the web of the primary spring clip and wherein a second leg of the primary spring clip includes a third anchoring element having a second recess, the apparatus further comprising:

an inner paneling for the structural part, the inner paneling having, in the region of the pane, a border section such that, at least in a region of the recess on the frame, where the primary spring clip is inserted, the border section protrudes into the recess of the frame on a side of the frame adjoining the pane and on a side of the frame facing away from the pane and is anchored on the tongue of the second anchoring element, the border section further comprising a portion which extends into the groove of the leg adjacent the pane of the generally U-shaped cross section of the recess of the frame;

wherein the portion is anchored at the second recess of the third anchoring element on the second leg of the primary spring clip.

13. The apparatus of claim 1 wherein the primary spring clip further comprises, on an outer side of the primary spring clip web, a fourth anchoring element including a secondary spring clip having first and second sections, the first section adjoining the primary spring clip and aligned at least approximately oppositely to a direction of extent of the legs of the primary spring clip and the second section aligned at least partly approximately parallel to the web of the primary spring clip, an end section of the second section having a smaller clear distance from the web than a remaining part of the second section, the apparatus further comprising:

an inner paneling for the structural part, the inner paneling having, in the region of the pane, a border section, a border section including, at least in the region of the recess on the frame which receives the primary spring clip with the fourth anchoring element, a retaining strip for receiving the secondary spring clip.

14. The apparatus of claim 1 wherein the legs of the primary spring clip have such a length that, after insertion of the legs into the recess on the frame, the web of the primary spring clip is spaced a distance from a wall section of the recess facing it and wherein the web of the primary spring clip includes at least one aperture, the apparatus further comprising:

an inner paneling for the structural part, the inner paneling having, in the region of the pane, a border section such that, at least in a region of the recess on the frame which receives the primary spring clip, the border section extends to a side of the frame adjoining the pane, wherein the border section includes a plastic projection extending through the aperture on the web of the primary spring clip and terminating in a head whereby the primary spring clip is anchored to the border section by the plastic projection.

15. The apparatus of claim 14 wherein a dimension of the head measured from an inner side of the web of the primary spring clip to an end of the head of the plastic projection is at least approximately equal to a distance from the web to the wall section of the recess facing it.

16. The apparatus of claim 1 wherein the primary spring clip further comprises, on an outer side of the web thereof, a fifth anchoring element including a tongue which is aligned oppositely to a direction of extent of the legs of the primary spring clip, the tongue being split in a longitudinal direction into end sections in an end region thereof, the end sections being spread apart in opposite directions, wherein the tongue is embedded in a material of a border section of an inner paneling of the structure.

17. The apparatus of claim 1 wherein the pane is made of glass.

18. The apparatus of claim 1 wherein the frame is made of a plastic material.

19. The apparatus of claim 1 wherein the frame is permanently bonded to the pane.

20. The apparatus of claim 1 wherein the peripheral rib has a relatively small cross section.

\* \* \* \* \*